(12) United States Patent
Janowski et al.

(10) Patent No.: US 10,584,187 B2
(45) Date of Patent: Mar. 10, 2020

(54) INITIATORS FOR THE COPOLYMERISATION OF DIENE MONOMERS AND VINYL AROMATIC MONOMERS

(71) Applicant: SYNTHOS S.A., Oswiecim (PL)

(72) Inventors: Bartlomiej Janowski, Debica (PL); Radoslaw Kozak, Chorzow (PL); Pawel Weda, Knurow (PL); Barbara Robak, Gliwice (PL)

(73) Assignee: SYNTHOS S.A., Oswiecim (PL)

( * ) Notice: Subject to any disclaimer, the term of this patent is extended or adjusted under 35 U.S.C. 154(b) by 110 days.

(21) Appl. No.: 15/565,360

(22) PCT Filed: Apr. 8, 2016

(86) PCT No.: PCT/EP2016/057757
§ 371 (c)(1),
(2) Date: Oct. 9, 2017

(87) PCT Pub. No.: WO2016/162482
PCT Pub. Date: Oct. 13, 2016

(65) Prior Publication Data
US 2018/0072821 A1   Mar. 15, 2018

(30) Foreign Application Priority Data

Apr. 10, 2015   (EP) .................... 15461524

(51) Int. Cl.
| | | |
|---|---|---|
| *C08C 19/44* | (2006.01) |
| *C08C 19/22* | (2006.01) |
| *C08F 36/14* | (2006.01) |
| *C08C 19/25* | (2006.01) |
| *C08F 236/10* | (2006.01) |
| *C08L 15/00* | (2006.01) |
| *C08K 3/04* | (2006.01) |
| *C08K 5/09* | (2006.01) |
| *C08F 2/60* | (2006.01) |
| *B60C 1/00* | (2006.01) |
| *C08F 8/42* | (2006.01) |
| *C08F 297/02* | (2006.01) |
| *C08K 3/36* | (2006.01) |
| *C08K 5/00* | (2006.01) |
| *C08L 9/00* | (2006.01) |
| *C08K 3/06* | (2006.01) |
| *C08K 3/22* | (2006.01) |
| *C08K 5/18* | (2006.01) |
| *C08K 5/31* | (2006.01) |
| *C08K 5/47* | (2006.01) |
| *C08K 5/548* | (2006.01) |

(52) U.S. Cl.
CPC ............ *C08C 19/44* (2013.01); *B60C 1/0016* (2013.01); *C08C 19/22* (2013.01); *C08C 19/25* (2013.01); *C08F 2/60* (2013.01); *C08F 8/42* (2013.01); *C08F 36/14* (2013.01); *C08F 236/10* (2013.01); *C08F 297/02* (2013.01); *C08K 3/04* (2013.01); *C08K 3/36* (2013.01); *C08K 5/0025* (2013.01); *C08K 5/09* (2013.01); *C08L 9/00* (2013.01); *C08L 15/00* (2013.01); *C08F 2810/20* (2013.01); *C08K 3/06* (2013.01); *C08K 3/22* (2013.01); *C08K 5/18* (2013.01); *C08K 5/31* (2013.01); *C08K 5/47* (2013.01); *C08K 5/548* (2013.01); *C08L 2312/08* (2013.01)

(58) Field of Classification Search
CPC ............. C08C 19/22; C08F 2/60; C08F 36/14
See application file for complete search history.

(56) References Cited

U.S. PATENT DOCUMENTS

| | | |
|---|---|---|
| 3,109,871 A | 11/1963 | Zelinski et al. |
| 3,253,008 A | 5/1966 | Fink |
| 4,196,154 A | 4/1980 | Tung et al. |
| 4,835,216 A | 5/1989 | Morikawa et al. |
| 4,861,742 A | 8/1989 | Bronstert et al. |
| 4,894,409 A | 1/1990 | Shimada et al. |
| 4,935,471 A | 6/1990 | Halasa et al. |
| 5,550,203 A | 8/1996 | Engel et al. |
| 6,515,087 B2 | 2/2003 | Hsu et al. |

(Continued)

FOREIGN PATENT DOCUMENTS

| | | |
|---|---|---|
| EP | 0 316 255 | 5/1989 |
| EP | 0 590 491 | 4/1994 |

(Continued)

OTHER PUBLICATIONS

International Search Report for PCT/EP2016/057757, dated Jun. 16, 2016, 2 pages.

(Continued)

*Primary Examiner* — Vickey Nerangis
(74) *Attorney, Agent, or Firm* — Nixon & Vanderhye P.C.

(57) ABSTRACT

The invention relates to the use of an alkali metal salt derivative of a specific vinyl aromatic monomer, as an initiator for the copolymerisation of i) one or more conjugated diene monomers and ii) one or more vinyl aromatic monomers. Furthermore, the invention relates to a process for the preparation of a copolymer component comprising coupled copolymer and terminally modified copolymer, and to the copolymer component. Also, the invention relates to a method for preparing a rubber, and to the rubber. Moreover, the invention relates to a rubber composition comprising the rubber. Finally, the invention relates to a tire component comprising the rubber, and to a tire comprising the tire component.

41 Claims, 3 Drawing Sheets

(56) References Cited

U.S. PATENT DOCUMENTS

| | | | |
|---|---|---|---|
| 6,627,721 B1 | 9/2003 | Rodewald et al. | |
| 6,627,722 B2 | 9/2003 | Rodewald et al. | |
| 6,630,552 B1 | 10/2003 | Rodewald et al. | |
| 6,670,471 B1 | 12/2003 | Rodewald et al. | |
| 8,431,644 B2 * | 4/2013 | Uesaka | B60C 1/0016 524/492 |
| 9,315,600 B2 * | 4/2016 | Hayata | C08K 3/36 |
| 9,587,060 B2 * | 3/2017 | Halasa | B60C 1/0016 |
| 2003/0134997 A1 | 7/2003 | Rodewald et al. | |
| 2004/0044157 A1 | 3/2004 | Halasa et al. | |
| 2004/0044202 A1 | 3/2004 | Halasa et al. | |
| 2004/0063884 A1 | 4/2004 | Halasa et al. | |
| 2004/0122194 A1 | 6/2004 | Halasa et al. | |
| 2004/0122224 A1 | 6/2004 | Halasa et al. | |
| 2005/0131181 A1 | 6/2005 | Halasa et al. | |
| 2007/0123631 A1 | 5/2007 | Halasa et al. | |
| 2009/0023861 A1 | 1/2009 | Shimakage et al. | |
| 2010/0116404 A1 | 5/2010 | Lechtenboehmer et al. | |
| 2010/0152364 A1 * | 6/2010 | Wong | B60C 1/0016 524/548 |
| 2011/0275756 A1 | 11/2011 | Ito et al. | |
| 2011/0275765 A1 | 11/2011 | Fujiwara et al. | |
| 2012/0041134 A1 | 2/2012 | Ito et al. | |
| 2014/0275430 A1 | 9/2014 | Ishino et al. | |
| 2018/0065996 A1 | 3/2018 | Maciejewski et al. | |
| 2018/0072101 A1 | 3/2018 | Janowski et al. | |

FOREIGN PATENT DOCUMENTS

| | | |
|---|---|---|
| EP | 1 792 892 | 6/2007 |
| EP | 2182028 | 5/2010 |
| EP | 2196326 | 6/2010 |
| EP | 2 277 940 | 1/2011 |
| EP | 2325027 | 11/2012 |
| EP | 2 749 575 | 7/2014 |
| EP | 2772515 | 9/2014 |
| JP | 7-82422 | 3/1995 |
| JP | 9-227636 | 9/1997 |
| JP | 2004-59781 | 2/2004 |
| JP | 2005-232261 | 9/2005 |
| JP | 2011-79913 | 4/2011 |
| WO | WO 2011/076377 | 6/2011 |
| WO | WO 2016/162473 | 10/2016 |
| WO | WO 2016/162528 | 10/2016 |
| WO | WO 2018/065486 | 4/2018 |
| WO | WO 2018/065494 | 4/2018 |

OTHER PUBLICATIONS

International Search Report for PCT/EP2016/057735 dated Jun. 17, 2016, 4 pages.
International Search Report for PCT/EP2016/057834, dated Jun. 16, 2016, 4 pages.
Abstract of Rasul et al., "Hydrosilylation reactions of tetramethyldisilazanes and their derivatives" *Journal of Organometallic Chemistry*, vol. 655, iss. 1-2: 115-119 (Aug. 2002).
Lee, S. et al., "Palladium-catalyzed synthesis of arylamines from aryl halides and lithium bis(trimethylsilyl) amide as an ammonia equivalent", Org. Lett., 2001 3(17), pp. 2729-2732.
Zapilko, C. et al., "Advanced Surface Functionalization of periodic mesoporous Silica: Kinetic Control by Trisilazane reagents", J. Am. Chem. Soc., 2006, 128(50), pp. 16266-16276.
Abstract of Rietz et al., "Reaktionen von Bis(trimethylsilyl)amino-substituierten Chlorsilanen [(Me3Si)2N]Me2—nPhnSiCl (n=0, 1, 2) mit Lithium—Darstellung von Bis(trimethylsilyl)amino-substituierten Silyllithiumverbindungen and Disilanen" *Journal of Organometallic Chemistry*, vol. 556, Issues 1-2, Apr. 15, 1998, pp. 67-74.
International Preliminary Report on Patentability issued in PCT/EP2016/057735 dated Oct. 10, 2017.
International Preliminary Report on Patentability issued in PCT/EP2016/057834 dated Oct. 10, 2017.
International Search Report issued in PCT/EP2017/075251 dated Jan. 18, 2018.
International Search Report issued in PCT/EP2017/075262 dated Jan. 18, 2018.
Written Opinion of the International Searching Authority issued in PCT/EP2017/075251 dated Jan. 18, 2018.
Written Opinion of the International Searching Authority issued in PCT/EP2017/075262 dated Jan. 18, 2018.
Office Action issued in KR Appln. No. 10-2018-7023211 dated Sep. 23, 2019 (w/ translation).
Office Action issued in U.S. Appl. No. 15/565,346 dated May 22, 2019.
Office Action issued in KR Appl. No. 10-2017-7032696 dated Sep. 25, 2019 (w/ translation).
Office Action issued in India Appln. No. 201717039945 dated Dec. 23, 2019 (with translation).
Office Action issued in JP Appln. No. 2017-552919 dated Nov. 19, 2019 (w/ translation).

* cited by examiner

INITIATORS FOR THE COPOLYMERISATION OF DIENE MONOMERS AND VINYL AROMATIC MONOMERS

This application is the U.S. national phase of International Application No. PCT/EP2016/057757 filed Apr. 8, 2016 which designated the U.S. and claims priority to EP Patent Application No. 15461524.9 filed Apr. 10, 2015, the entire contents of each of which are hereby incorporated herein by reference.

FIELD OF THE INVENTION

The invention relates to the use of an alkali metal salt derivative of a specific vinyl aromatic monomer, as an initiator for the copolymerisation of i) one or more conjugated diene monomers and ii) one or more vinyl aromatic monomers. Furthermore, the invention relates to a process for the preparation of a copolymer component comprising coupled copolymer and terminally modified copolymer, and to the copolymer component. Also, the invention relates to a method for preparing a rubber, and to the rubber. Moreover, the invention relates to a rubber composition comprising the rubber. Finally, the invention relates to a tire component comprising the rubber, and to a tire comprising the tire component.

BACKGROUND OF THE INVENTION

It is important for rubbery polymers that are used in tires, hoses, power transmission belts and other industrial products to have good compatibility with fillers, such as carbon black and silica. It has also been recognized that the filler in rubber compounds should be well dispersed throughout the rubber, in order to improve various physical properties. Such polymers can be functionalized with various compounds, such as amines and silanes, to attain a improved interaction with filler and a better dispersion of the filler throughout the rubbery polymers. For instance, fillers (such as carbon black and silica) are used in standard rubber compounds for tire treads.

EP 2 196 326 A1 discloses a process for the copolymerization of amine monomer and conjugated diolefin monomer, and that polymers can be terminated with a terminating agent having a hydrolyzable group. One example for the amine monomer is vinylbenzylpyrrolidine. Embodiments of initiation systems include anionic initiators, such as alkyl lithium compounds.

EP 2 772 515 A1 teaches a rubber composition comprising a conjugated diene polymer and a silica. The polymer is obtained by polymerizing a monomer component including (i) conjugated diene compound and (ii) silicon-containing vinyl compound, in the presence of a polymerization initiator. The teaching of this document allows one to obtain elastomers with functional groups that are able to interact with the filler, but these features are achieved by use of additional organosilicon comonomer which is located in the polymer main chain and may deteriorate the processability of rubber. Also, there is no possibility to control weak interactions between rubber and filler, since the amine initiators contain only one amino group.

US 2010/116404 A1 teaches the synthesis of functionalized elastomer derived from styrene, 1,3-butadiene, and an amine-substituted styrene. The functionalized elastomer is used, in admixture with diene-based elastomer, and in further admixture with polyketone short fiber.

U.S. Pat. No. 6,627,722 B2 discloses a polymer containing units of a vinyl aromatic monomer (ring-substituted with one or two alkyleniminealkyl groups) that can be polymerized into rubbery polymers having low hysteresis and good compatibility with fillers, such as carbon black and silica.

EP 2 182 028 A1 teaches modified butadiene rubber having a vinyl content of 35% by weight or less and having, in a main chain, a nitrogen-containing styrene derivative which provides improving rolling resistance performance. The preparation of N-functionalized polymers with different contents of N-functional groups, by incorporation of suitable styrene monomers into the polymer chain, leads to a wide variety of styrene-butadiene rubbers with different content of N-functional groups and thus exhibiting different dispersing properties of inorganic fillers. The N-functionalized styrene derivatives are based on divinylbenzenes.

US 2011/0275756 A1 teaches the synthesis of functionalized SSBR containing amine-substituted styrene and nitrogen-containing silicon-organic groups on the polymer chain end.

U.S. Pat. No. 5,550,203 B teaches anionic initiators for use in polymerizing olefin-containing monomers. The initiators are derived from amines.

Therefore, it was the object of the invention to provide an elastomeric copolymer with controlled micro- and macrostructure and with precisely controlled location of functional groups of a given type which allow controlling the weak interaction between the filler and the rubber, thus influencing tire wet traction and strong interactions which are responsible for rolling resistance. Moreover, these advantages should be achieved without any additional organosilicon or amine comonomer in the polymer main chain, the presence of which might otherwise deteriorate the processability of rubber.

It has now surprisingly been found that this object is achieved and the problems of the prior art overcome by the use of an alkali metal salt derivative of a vinyl aromatic monomer having general formula (A)

(A)

wherein
the alkali metal is selected from lithium, sodium, and potassium; and
R is selected from groups of formula (B) and (C):

(B)

-continued

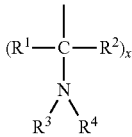

(C)

wherein
  x is an integer of from 1 to 10;
  n is an integer of from 2 to 10;
  $R^1$ and $R^2$ groups within a repeat unit and in different repeat units are independently selected from a hydrogen atom and an alkyl group having from 1 to 4 carbon atoms; and
  $R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula $-(CH_2)_y-O-(CH_2)_z-CH_3$, wherein y is an integer of from 1 to 10 and z is an integer of from 1 to 10;
as an initiator for the copolymerization of i) one or more conjugated diene monomers and ii) one or more vinyl aromatic monomers.

The present invention provides copolymer elastomers of dienes with strictly designed micro- and macrostructure and with precisely selected location, type and amount of functional groups in the polymer chain. The copolymers prepared according to the present invention contain two types of functional groups, which performs a balance between strong and weak interactions between polymer and filler (in particular silica and/or carbon black).

A first type of functional group which is chemically bound and incorporated into the polymer chain is a tertiary amine group which provides weak interactions between polymer and fillers (such as silica and/or carbon black). Weak interactions, such as for example hydrogen bonds formed between silica particles and tertiary amino-group from polymer chain, contribute to higher tan δ at 0° C., which corresponds to enhanced wet traction when these types of polymers are used in tread parts of tires.

A second type of functional group may be an alkoxysilyl group (SiOR) and may be chemically bound and incorporated at a terminus of the polymer chain; this allows for the formation of strong intermolecular bonds between polymer and silica. Strong interactions significantly improve (tan δ at 60° C.) which relates to rolling resistance and hysteresis loss, i.e. the failure of a property that has been changed by an external agent to return to its original value when the cause of the change is removed.

Additionally, the introduction of controlled amounts of functional groups of various types, i.e. providing weak and strong interactions with filler, allows the optimal formation of bonds between polymer and filler and thus contributes to enhanced reinforcement and increased abrasion resistance.

The vulcanizable copolymer components of the invention are based on functionalized polymers, and articles prepared therefrom exhibit multiple advantages as compared to the articles based on non-functionalized polymers, particularly with regard to reduced hysteresis at similar or improved wet traction. Furthermore, the modification of the polymer with a combination of functional groups of both types provides far better reduction of hysteresis of vulcanizates in comparison with vulcanizates prepared from non-functionalized compounds or those containing only one type of functional group.

The present invention allows for the preparation of functionalized polymers with controlled micro- and macrostructure and with precisely controlled location of functional groups of a given type. Furthermore, the present invention gives copolymer components comprising fractions Q and T, both being functionalized via various patterns. The content of fraction Q, indicated as x, may range from 0.01- to 100 weight percent, and the content of fraction T, indicated as y, expressed as 100-x weight percent, may range from 99.99- to 0.01 weight percent. The overall content of both fractions typically sums up to about 100 weight percent.

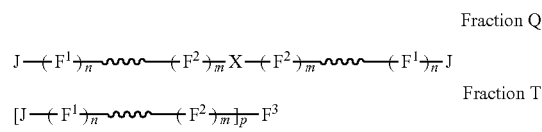

In the above formula, $F^1$ represents the monomer of formula (A), containing a functional group capable of forming weak interactions with filler. $F^1$ can be located at the alpha and/or the omega end of the copolymer;

$F^2$ represents the same monomer as $F^1$, or a different one, and also contains functional group capable of weak interactions, similar or different than in $F^1$. $F^2$ is located more in the centre of the copolymer.

$F^3$ represents the terminal modifying agent as used for the functionalization of the omega terminus of the polymer and typically contains alkoxysilyl groups responsible for strong interactions.

n indicates the number of repeating units of $F^1$, and preferably ranges from 1 to 20 repeating units;

m indicates the number of repeating units of $F^2$, and preferably ranges from 1 to 20 repeating units; p represents the number of polymer chains covalently bound to $F^3$ (derived from the terminal modifying agent), preferably being in a range of from 0 and 10.

J represents the organic residue of the organometallic compound used to prepare the initiator of the invention and may e.g. be an alkyl group, aryl group, phenyl group, protected amine or protected hydroxyl group.

X represents the moiety derived from the coupling agent reacted with the nucleophilic end of the copolymer, the coupling agent typically having general formula $X^1_n Y_p X^2_m$ (E).

SUMMARY OF THE INVENTION

In a first aspect, the invention relates to the use of the alkali metal salt derivative as defined above, as an initiator for the copolymerization of i) one or more conjugated diene monomers and ii) one or more vinyl aromatic monomers.

In a second aspect, the invention relates to a process for the preparation of a copolymer component comprising a coupled copolymer and a terminally modified copolymer.

In a third aspect, the invention relates to a copolymer component comprising coupled copolymer and terminally modified copolymer.

In a fourth aspect, the invention relates to a method for preparing a rubber comprising vulcanizing the copolymer component according to the third aspect.

In a fifth aspect, the invention relates to the rubber as obtainable with the method according to the fourth aspect.

In a sixth aspect, the invention relates to a rubber composition comprising the rubber according to the fifth aspect.

In a seventh aspect, the invention relates to a tire component comprising the rubber composition according to the sixth aspect.

In an eight aspect, the invention relates to a tire comprising the tire component according to the seventh aspect.

DETAILED DESCRIPTION

Figure 1:
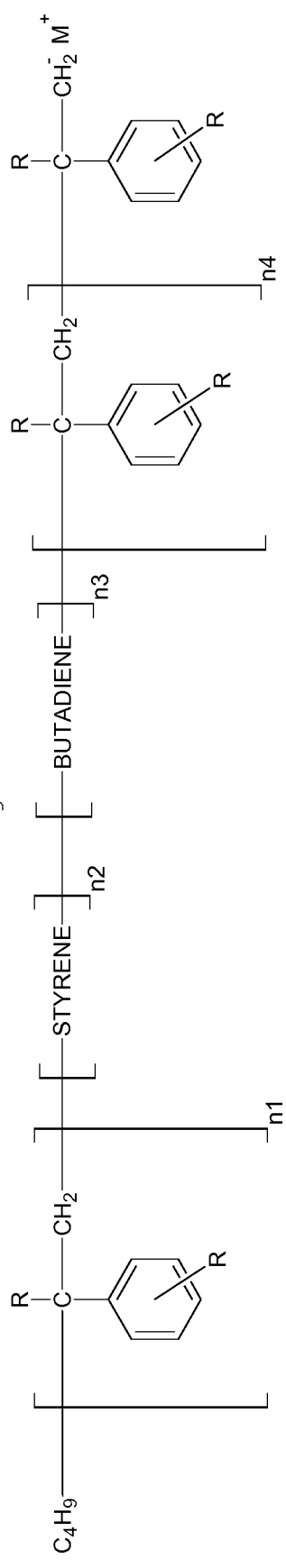
FIG. 1 shows a copolymer with the general formula (V).

According to the first aspect, the invention relates to the use of an alkali metal salt derivative of a vinyl aromatic monomer having general formula (A)

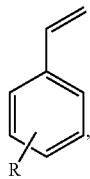

(A)

wherein
the alkali metal is selected from lithium, sodium, and potassium; and
R is selected from groups of formula (B) and (C):

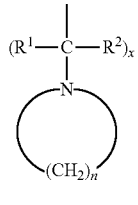

(B)

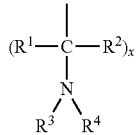

(C)

wherein
x is an integer of from 1 to 10;
n is an integer of from 2 to 10;
$R^1$ and $R^2$ groups within a repeat unit and in different repeat units are independently selected from a hydrogen atom and an alkyl group having from 1 to 4 carbon atoms; and
$R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula —$(CH_2)_y$—O—$(CH_2)_z$—$CH_3$, wherein y is an integer of from 1 to 10 and z is an integer of from 1 to 10;
as initiator for the copolymerization of i) one or more conjugated diene monomers and ii) one or more vinyl aromatic monomers.

Alkali Metal

The alkali metal is selected from lithium, sodium, and potassium, and is preferably lithium.

The alkali metal typically becomes part of the alkali metal salt derivative of the invention by reaction of an organometallic compound with the vinyl aromatic compound of formula (A). Thus, the alkali metal salt derivative is typically prepared by reaction of one or more organometallic compounds with one or more monomers having general formula (A). The time of reaction between organometallic compound and monomer of formula (A) is preferably from 1 to 60 min, more preferably from 1 to 20 min and most preferably from 1 to 10 min.

The organometallic compound may be an organometallic lithium compound, organic sodium compound, or organic potassium compound:

As the organometallic lithium compound, there are preferred those having a hydrocarbon group having 1 to 20 carbon atoms; for example, methyllithium, ethyllithium, n-propyllithium, isopropyllithium, n-butyllithium, sec-butyllithium, tert-butyllithium, tert-octyllithium, n-decyllithium, phenyllithium, 2-naphthyllithium, 2-butylphenyllithium, 4-phenylbutyllithium, cyclohexyllithium and cyclopentyllithium; of these compounds, n-butyllithium and sec-butyllithium are preferred.

As the organometallic sodium compound, there are preferred those having a hydrocarbon group having 1 to 20 carbon atoms; for example, methylsodium, ethylsodium, n-propylsodium, isopropylsodium, n-butylsodium, sec-butylsodium, tert-butylsodium, tert-octylsodium, n-decylsodium, phenylsodium, 2-naphthylsodium, 2-butylphenylsodium, 4-phenylbutylsodium, cyclohexylsodium and cyclopentylsodium; of these compounds, n-butylsodium and sec-butylsodium are preferred.

As the organometallic potassium compound, there are preferred those having a hydrocarbon group having 1 to 20 carbon atoms; for example, methylpotassium, ethylpotassium, n-propylpotassium, isopropylpotassium, n-butylpotassium, sec-butylpotassium, tert-butylpotassium, tert-octylpotassium, n-decylpotassium, phenylpotassium, 2-naphthylpotassium, 2-butylphenylpotassium, 4-phenylbutylpotassium, cyclohexylpotassium and cyclopentylpotassium; of these compounds, n-butylpotassium and sec-butylpotassium are preferred.

The mole ratio of organometallic compound to monomer of formula (I) is preferably in a range of from 0.05:1 to 1:1, more preferably in a range of from 0.1:1 to 1:1, most preferably in a range of from 0.2:1 to 1:1.

It is preferred in all embodiments of the invention that the organometallic compound is an organometallic lithium compound, preferably selected from n-butyllithium, sec-butyllithium, and tert-butyllithium.

In formula (A), R is preferably a group of formula (B), and
x is 1 or 2, preferably 1;
$R^1$ is a hydrogen atom, preferably wherein $R^1$ and $R^2$ are both a hydrogen atom, and
n is 4 or 6, preferably 4.

Most preferably, the compound of formula (A) is N-vinylbenzylpyrrolidine, in particular the N-vinylbenzylpyrrolidine is N-(3-vinylbenzyl)pyrrolidine or N-(4-vinylbenzyl)

pyrrolidine, and more preferably the mixture of N-(3-vinylbenzyl)pyrrolidine and N-(4-vinylbenzyl)pyrrolidine.

Preferably, the alkali metal salt derivative is of formula (D)

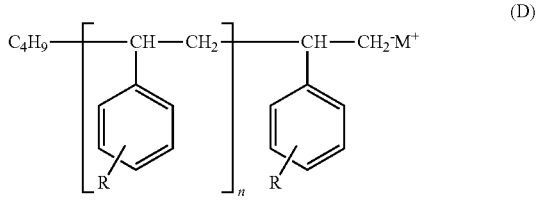

wherein

M⁺ is the alkali metal, preferably lithium;

n is an integer of from 0 to 20, preferably from 0 to 10 and most preferably from 0 to 5; and $C_4H_9$ is n-$C_4H_9$ or sec-$C_4H_9$.

The alkali metal salt derivative according to the invention, derived from functionalized monomer, acts as a functionalizing agent allowing modification of the α-terminal of the copolymer. The number of repeating units of functionalized monomer of formula (A) can be controlled and adjusted to the particular needs of the specific application.

The derivative is according to the first aspect used as an initiator for the copolymerization of i) one or more conjugated diene monomers and ii) one or more vinyl aromatic monomers.

Conjugated Diene Monomer

According to the present invention, the copolymer comprises, in addition to units derived from the monomer of formula (A), units derived from one or more conjugated diene monomers. Any anionically polymerizable conjugated diolefin may be used. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative and preferred examples of conjugated diene monomers that can be copolymerized according to the invention include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

Preferred conjugated dienes are 1,3-butadiene and isoprene, in particular 1,3-butadiene.

Vinyl Aromatic Monomer

The copolymer of the present invention further comprises one or more vinyl aromatic monomers. Some representative and preferred examples of vinyl aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-n-hexylstyrene, 4-phenylstyrene, 2-ethyl-4-benzyl-styrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, and α-methylstyrene.

Preferred are styrene and α-methylstyrene, in particular styrene.

Polymer Preparation

In a second aspect, the invention relates to the preparation of a copolymer component comprising coupled copolymer and terminally modified copolymer, the process comprising:

a) providing an initiator component comprising one or more of the alkali metal salt derivatives as defined according to the first aspect;
b) contacting a monomer component comprising
   i) one or more conjugated diene monomers and
   ii) one or more vinyl aromatic monomers
   with the initiator component, to initiate anionic copolymerization;
c) continuing copolymerization, to result in a copolymer;
d) continuing copolymerization of the copolymer, in the presence of one or more functionalized monomers, to result in a functionalized copolymer;
e) coupling a part of the functionalized copolymer with one or more coupling agents, to result in coupled copolymer;
f) terminally modifying a part of the functionalized copolymer with one or more terminal modifying agents, to result in terminally modified copolymer.

Preferably, step b) is the addition of the initiator component to the monomer component, to initiate anionic copolymerization.

The copolymer is typically prepared by forming a solution of the one or more anionically copolymerizable monomers i) and ii) above in a solvent, and initiating the copolymerization of the monomers with the alkali metal derivative as described above. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, n-hexane, benzene, toluene, xylene, ethylbenzene, tetrahydrofuran, and the like, alone or in admixture.

Copolymers of the invention typically comprise from about 99.99 to 30 percent by weight of diene units and from 0.01 to 70 percent by weight of vinyl aromatic monomer units.

Copolymers described by this invention typically have 1,2-microstructure contents in a range of from 5% to 100%, preferably from 10% to 90% and most preferably from 20% to 80%, based upon the diene content.

To obtain a random structure of copolymer and/or increase the vinyl structure content, especially when specifically styrene and butadiene monomers are used, an internal modifier may optionally be added to the polymerization, with the usage between 0 to 90 or more equivalents per equivalent of lithium. The amount depends upon the type of internal modifier and the amount of vinyl desired, the level of styrene employed and the temperature of the polymerization. The polymerization process of this invention is normally conducted in the presence of polar internal modifiers, such as tertiary amines, alcoholates or alkyltetrahydrofurfuryl ethers. Some representative examples of specific internal polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methylmorpholine, N-ethylmorpholine, N-phenylmorpholine.

A potassium or sodium compound may be added in step b), preferably together with the polymerization initiator, when it is intended to increase the reactivity of the polymerization initiator or when it is intended to arrange the vinyl aromatic monomer at random in the copolymer obtained, or to allow the obtained copolymer to contain the vinyl aromatic monomer as a single chain. As the potassium or sodium compound added together with the polymerization initiator, there can be used, for example: alkoxides and phenoxides, typified by isopropoxide, tert-butoxide, tert-amyloxide, n-heptaoxide, benzyloxide, phenoxide and mentholate; potassium or sodium salts of organic sulfonic acids such as dodecylbenzensulfonic acid, tetradecylbenzenesulfonic acid, hexadecylbenzenesulfonic acid, and octadecylbenzenesulfonic acid.

The potassium or sodium compound is preferably added in an amount of 0.005 to 0.5 mol per mol equivalent polymerization initiator. When the amount is less than 0.005 mol, the addition effect of the potassium compound (the increase in the reactivity of polymerization initiator and the randomization or single chain addition of aromatic vinyl compound) may not appear. Meanwhile, when the amount is more than 0.5 mol, there may be a reduction in polymerization activity and a striking reduction in productivity and, moreover, there may be a reduction in the internal modification efficiency in this primary modification reaction.

The copolymer can be made in a batch process, or in a continuous process by continuously charging the monomers i) and ii) into a polymerization zone.

After stabilization of the temperature of the monomer mixture, in a range typically from −20 to 160° C., the initiator of the invention is preferably added (step b)). The resultant reaction mixture is typically agitated, to sustain homogenization of temperature and of all reagents in polymer solution. The reaction is typically carried out under anhydrous, anaerobic conditions. Reaction can be carried out for about 0.1 to 24 hours, depending on the temperature, molecular weight of desired product and modifier used. After the reaction according to step c) is completed (i.e. full conversion is achieved) steps d), e) and f) should be performed, depending on the desired structure of the product.

After the polymerization of monomers in step c) is finished, functionalization of the omega terminal of the copolymer is performed, according to steps e) and f).

In step d), and to perform omega end functionalization, addition of functionalized monomer to living polymer solution resulting from step c) is performed. It is preferable to use one of the functionalized monomers of general formula (I). Addition of functionalized monomer according to step d) should most preferably be performed at conditions that are similar to the polymerization conditions in step c).

After the addition of functionalized monomer to the living polymer chain end, the resulting copolymer can be described with the general formula (V), see FIG. 1.

In formula (V), n1 is an integer of from 0 to 20, n2 is an integer of from 0 to 10,000, n3 is an integer of from 0 to 10,000 and n4 is an integer of from 0 to 20, and n2+n3>0.

Coupling in step e) is preferably done by addition of the selected coupling agent to the copolymer system resulting from step d). Preferably, the addition is at conditions similar or close to the polymerization conditions described for step c).

It should be noted that, according to the invention, the fraction of copolymer chains being coupled can vary between 0.01 (nearly no coupling) to 99.99% (nearly all chains subjected to coupling), which is achieved by the controlled addition of coupling agent, in the amount required to bond the desired fraction of the copolymer chains. The exact amount of coupling agent is calculated based on its theoretical functionality and required coupling fraction.

Functionality of coupling compound should be understood as theoretical number of living chain ends which may undergo a reaction with coupling agent.

The structures of best performing coupling agents are shown below (E-I to E-V):

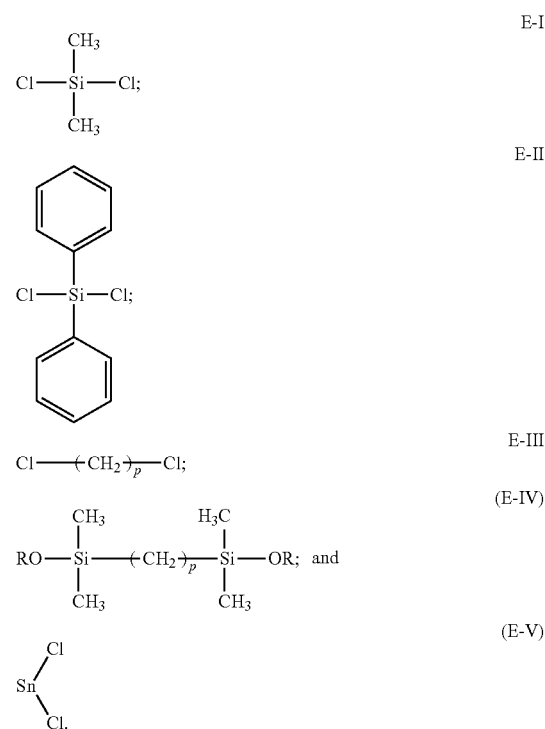

The above examples are coupling agents having a functionality of two, but it should be noted that this invention does not put any restriction on the functionality of the coupling agent. However, it is preferable to use a coupling agent having a functionality ranging from 1 to 8.

Figure 2:
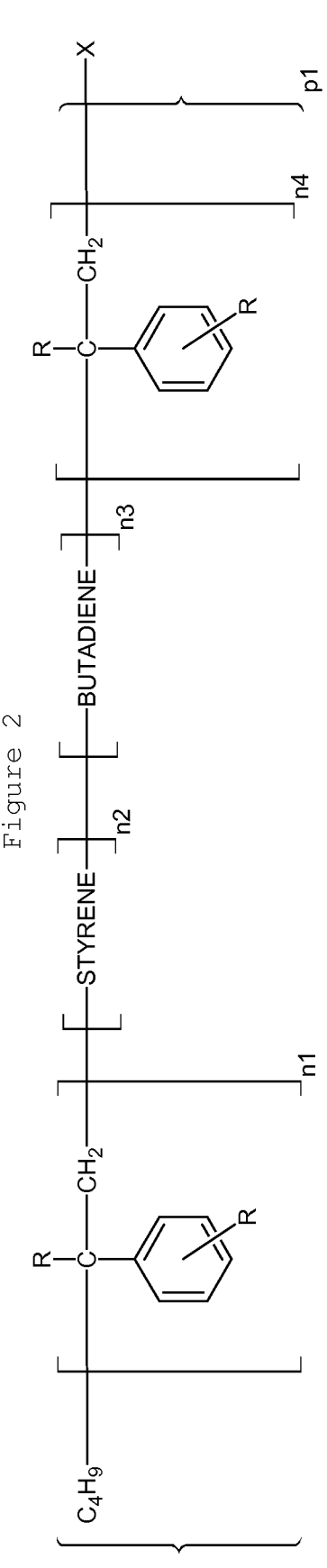
FIG. 2 shows a copolymer with the general formula (VI).

After the coupling of copolymer chains functionalized with functionalized initiator and functionalized monomer, the copolymer represented by described earlier general formula 'Fraction Q' is obtained (see formula (VI) in FIG. 2).

In formula (VI), n1 is an integer of from 0 to 20, n2 is an integer of from 0 to 10,000, n3 is an integer of from 0 to 10,000, n4 is an integer of from 0 to 20, and where n2+n3>0. Also $R^1$ and $R^2$, represent the functional groups described previously, p1 is an integer which describes the functionality of the coupling agent, and X represents the residue of the coupling agent.

Figure 3:
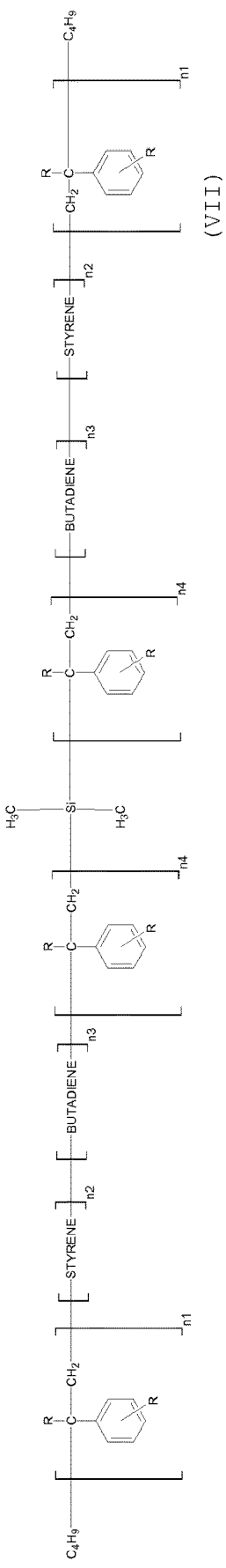
FIG. 3 shows a copolymer with the general formula (VII).

For example, when dimethyldichlorosilane is used as coupling agent, the resulting copolymer can be described as follows (see formula (VII) in FIG. 3).

In step f), the terminal modifying agent responsible for formation of strong interactions with fillers such as silica or carbon black is added to the copolymer solution, providing the final copolymer described earlier as 'Fraction T'.

It should be noted that the terminal modifying agent reacts with any remaining living polymer chains which were not reacted earlier with coupling agent, as described in step e) above.

Any compound containing at least one atom selected from the group consisting of nitrogen, oxygen and silicon, and being reactive toward a living polymer chain, can be used as terminal modifying agent. Examples of the terminal modifying group containing at least one atom selected from the group consisting of nitrogen, oxygen and silicon include: an amino group, an amide group, an alkoxysilyl group, an isocyanato group, an imino group, an imidazole group, an urea group, an ether group, a carbonyl group, a carboxyl group, a hydroxyl group, a nitrile group, a pyridyl group.

Specific examples of terminal modifying agents include:
3-glycidoxypropyltrimethoxysilane,
(3-triethoxysilylpropyl)tetrasulfide,
1-(4-N,N-dimethylaminophenyl)-1-phenylethylene,
1,1-dimethoxytrimethylamine,
1,2-bis(trichlorosilyl)ethane,
1,3,5-tris(3-triethoxysilylpropyl)isocyanurate,
1,3,5-tris(3-trimethoxysilylpropyl)isocyanurate,
1,3-dimethyl-2-imidazolidinone,
1,3-propanediamine,
1,4-diaminobutane,
1-[3-(triethoxysilyl)propyl]-4,5-dihydroimidazole,
1-glycidyl-4-(2-pyridyl)piperazine,
1-glycidyl-4-phenylpiperazine,
1-glycidyl-4-methylpiperazine,
1-glycidyl-4-methylhomopiperazine,
1-glycidylhexamethyleneimine,
11-aminoundecyltriethoxysilane,
11-aminoundecyltrimethoxysilane,
1-benzyl-4-glycidylpiperazine,
2-(3,4-epoxycyclohexyl)ethyltrimethoxysilane,
2-(4-morpholinodithio)benzothiazole,
2-(6-aminoethyl)-3-aminopropyltrimethoxysilane,
2-(triethoxysilylethyl)pyridine,
2-(trimethoxysilylethyl)pyridine,
2-(2-pyridylethyl)thiopropyltrimethoxysilane,
2-(4-pyridylethyl)thiopropyltrimethoxysilane,
2,2-diethoxy-1,6-diaza-2-silacyclooctane,
2,2-dimethoxy-1,6-diaza-2-silacyclooctane,
2,3-dichloro-1,4-naphthoquinone,
2,4-dinitrobenzenesulfonyl chloride,
2,4-tolylene diisocyanate,
2-(4-pyridylethyl)triethoxysilane,
2-(4-pyridylethyl)trimethoxysilane,
2-cyanoethyltriethoxysilane,
2-tributylstannyl-1,3-butadiene,
2-(trimethoxysilylethyl)pyridine,
2-vinylpyridine,
2-(4-pyridylethyl)triethoxysilane,
2-(4-pyridylethyl)trimethoxysilane,
2-laurylthioethylphenyl ketone,
3-(1-hexamethyleneimino)propyl(triethoxy)silane,
3-(1,3-dimethylbutylidene)aminopropyltriethoxysilane,
3-(1,3-dimethylbutylidene)aminopropyltrimethoxysilane,
3-(2-aminoethylaminopropyl)trimethoxysilane,
3-(m-aminophenoxy)propyltrimethoxysilane,
3-(N,N-dimethylamino)propyltriethoxysilane,
3-(N,N-dimethylamino)propyltrimethoxysilane,
3-(N-methylamino)propyltriethoxysilane,
3-(N-methylamino)propyltrimethoxysilane,
3-(N-allylamino)propyltrimethoxysilane,
3,4-diaminobenzoic acid,
3-aminopropyldimethylethoxysilane,
3-aminopropyltriethoxysilane,
3-aminopropyltrimethoxysilane,
3-aminopropyltris(methoxydiethoxy)silane,
3-aminopropyldiisopropylethoxysilane,
3-isocyanatepropyltriethoxysilane,
3-glycidoxypropyltriethoxysilane,
3-thioglycidoxypropyltrimethoxysilane, and
3-thioglycidoxypropyltriethoxysilane.

The amount of terminal modifying agent to be used depends on its functionality (i.e. number of groups being able to form bonds with living polymer chains) and the amount of living polymer chains. It is well known that in case of terminal modifying agents bearing a functionality greater than 1, exact control of the amount of coupling agent used allows to further influence copolymer properties and i.e. introduce additional coupling. Preferred amounts of terminal modifying agent are in a range of from 0.001 to 50 mol per 1 mol of living chain ends, more preferably is to use range from 0.5 mol to 10 mol per 1 mol of living chain ends.

After the addition of terminal modifying agent in step f), antioxidants, and/or alcohols for stopping polymerization reaction may be added, if necessary (step g).

Figure 4:
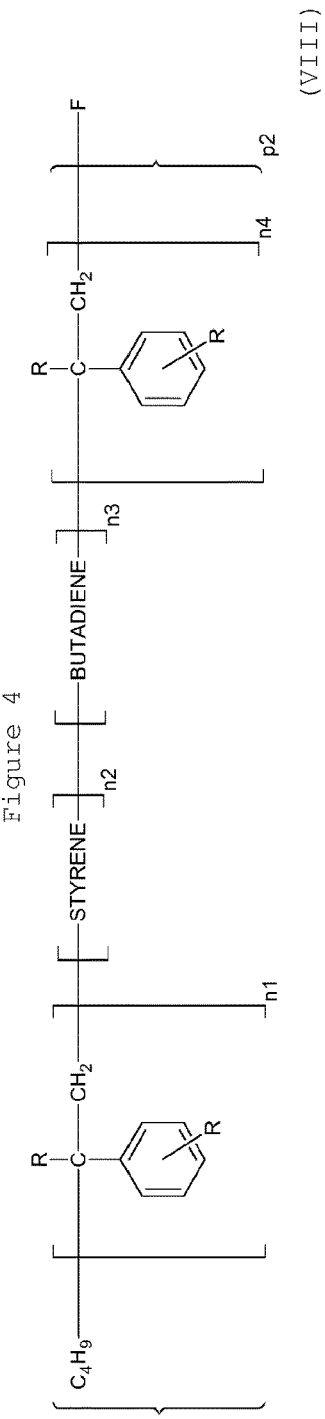
FIG. 4 shows a copolymer with the general formula (VIII).

The copolymer resulting from the addition of functionalization agent could be described with general formula (VIII), see FIG. 4. In formula VII, n1 is an integer of from 0 to 20, n2 is an integer of from 0 to 10,000, n3 is an integer of from 0 to 10,000, n4 is an integer of from 0 to 20, and where $n2+n3>0$;

R1, R2, R3, R4 represent functional groups described above (see step a);

p2 describes the functionality of the terminal modifying agent and can vary from 1 to 9; and F represents the residue of the terminal modifying agent.

Figure 5:
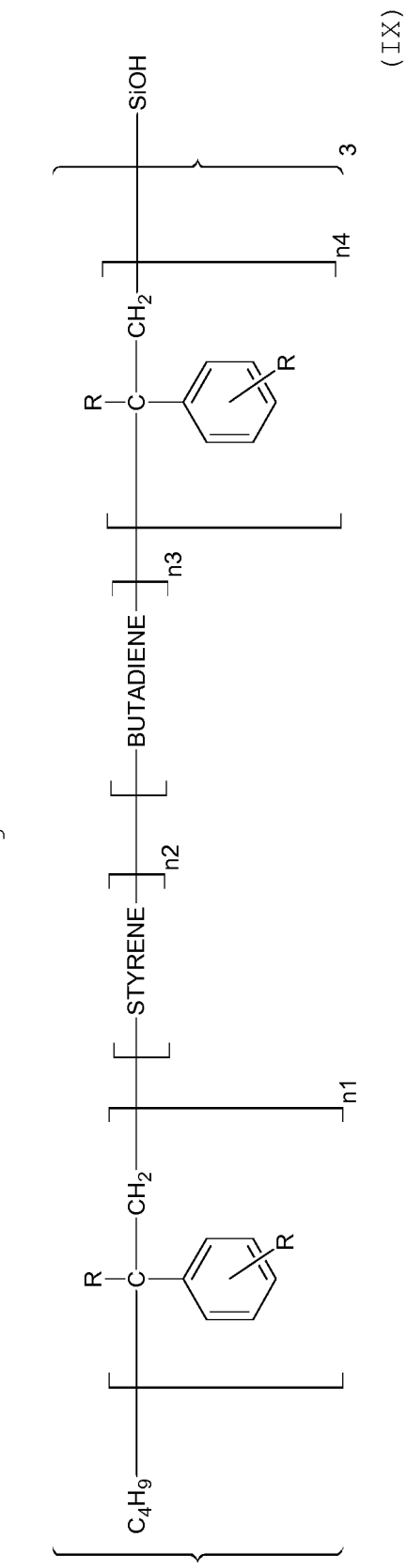
FIG. 5 shows a copolymer with the general formula (IX).

When glycidoxypropyltrimethoxysilane is used as terminal modifying agent, the resulting copolymer would have structure (IX), see FIG. 5.

In a third aspect, the invention relates to a copolymer component comprising coupled copolymer I) and terminally modified copolymer II).

The coupled copolymer I) is obtained by a process comprising
  Ia. contacting a monomer component comprising i) one or more conjugated diene monomers and ii) one or more vinyl aromatic monomers, in the presence of an initiator component comprising one or more alkali metal salt derivatives as defined according to the first aspect;
  Ib. further copolymerization in the presence of one or more functionalized monomers, to result in a functionalized copolymer; and
  Ic. coupling at least part of the functionalized copolymer with one or more coupling agents, to result in the coupled copolymer.

The terminally modified copolymer II) is being obtained by a process comprising
  IIa. contacting a monomer component comprising i) one or more conjugated diene monomers and ii) one or more vinyl aromatic monomers, in the presence of an initiator component comprising one or more alkali metal salt derivatives as defined according to the first aspect;
  IIb. further copolymerization in the presence of one or more functionalized monomers, to result in a functionalized copolymer; and
  IIc. terminally modifying at least part of the functionalized copolymer with one or more terminal modifying agents, to result in the terminally modified copolymer.

Preferably, the copolymer is obtained by the process according to the second aspect.

Further preferably, the copolymer component comprises 1 to 99% by weight of coupled copolymer, preferably 50 to 90% by weight of coupled copolymer, more preferably 60 to 80% by weight of coupled copolymer; and 99 to 1% by weight of terminally modified copolymer, preferably 10 to 50% by weight of terminally modified copolymer, more preferably 20 to 40% by weight of terminally modified copolymer.

Most preferred is a copolymer component wherein the coupled copolymer has 1 to 11 terminal groups based on the vinyl aromatic monomer having general formula (A), preferably 1 to 5.

The coupling agent is preferably of general formula (E):

(E), wherein

Y is selected from silicon (Si), tin (Sn), titanium (Ti), sulfur (S), carbon (C), germanium (Ge), zirconium (Zr), lead (Pb), hafnium (Hf), oxygen (O), and nitrogen (N) atoms and methylene ($CH_2$) groups, or their combination; and p is in a range of from 1 to 20;

$X^1$ is independently selected from
hydrogen (H), chlorine (Cl), bromine (Br) iodine (I), and fluorine (F) or their combination;
alkyl groups containing 1-20 carbon atoms;
hydrocarbyloxy groups where the hydrocarbyl group may contain 1-20 atoms;
alkylsilyl groups where the alkyl group may contain 1-20 atoms;
alkoxysilyl groups where the alkyl group may contain 1-10 carbon atoms;
epoxide or episulfide groups containing 2 to 20 carbon atoms;
or combinations thereof; and
where n is in the range of from 0 to 6;

$X^2$ is independently selected from
hydrogen (H), chlorine (Cl), bromine (Br) iodine (I), and fluorine (F) or their combination;
alkyl groups containing 1-20 carbon atoms;
hydrocarbyloxy groups where the hydrocarbyl group may contain 1-20 atoms;
alkylsilyl groups where the alkyl group may contain 1-20 atoms;
alkoxysilyl groups where the alkyl group may contain 1-10 carbon atoms;
epoxide or episulfide groups containing 2 to 20 carbon atoms;
or combinations thereof; and
where m is in the range of from 0 to 6.

More preferably, the coupling agent is a silicon halide coupling agent, and the silicon halide coupling agent is preferably selected from silicon tetrachloride, silicon tetrabromide, silicon tetrafluoride, silicon tetraiodide, hexachlorodisilane, hexabromodisilane, hexafluorodisilane, hexaiododisilane, octachlorotrisilane, octabromotrisilane, octafluorotrisilane, octaiodotrisilane, hexachlorodisiloxane, 2,2,4,4,6,6-hexachloro-2,4,6-trisilaheptane, 1,2,3,4,5,6-hexakis[2-(methyldichlorosilyl)ethyl]benzene, and alkyl silicon halides of general formula (G)

(G), wherein $R^5$ is a monovalent aliphatic hydrocarbon group having 1 to 20 carbon atoms or a monovalent aromatic hydrocarbon group having 6 to 18 carbon atoms; n is an integer of from 0 to 2; and $X^3$ is selected from chlorine, bromine, fluorine, and iodine atoms.

Likewise preferred is a copolymer component wherein the terminal modified copolymer has 1 to 11 terminal groups based on the vinyl aromatic monomer having general formula (I), at the terminus other than the terminus modified with the terminal modified agent.

Further preferred is a copolymer component wherein the terminal modifying agent comprises alkoxysilyl groups.

In a fourth aspect, the invention relates to a method for preparing a rubber comprising vulcanizing the copolymer component according to the third aspect.

In a fifth aspect, the invention relates to a rubber as obtainable according to the method of the fourth aspect.

In a sixth aspect, the invention relates to a rubber composition comprising x) the rubber according to the fifth aspect.

Preferably, the rubber composition further comprises y) a filler component comprising one or more fillers. The filler is preferably selected from silica and carbon black. It is prererred that the y) filler component comprises silica and carbon black.

Preferably, the rubber composition comprises
x) a rubber component comprising 15% by weight or more (preferably 20% by weight or more, more preferably 30% by weight or more) of the rubber of the fifth aspect, and
y) a filler component in an amount of 10 to 150 parts by weight relative to 100 parts by weight of the rubber component.

The rubber component may further comprise one or more further rubbers, and the further rubber is preferably selected from natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, and halo-genated butyl rubber.

In a seventh aspect, the invention relates to a tire component comprising the rubber composition according to the sixth aspect.

In an eight aspect, the invention relates to a tire comprising the tire component according to the seventh aspect.

The advantages of the present invention become apparent from the following examples. Unless indicated otherwise, all percentages are given by weight.

EXAMPLES

In order to provide more details about the synthesis and properties of copolymers prepared according to the present invention, functionalized styrene-butadiene copolymers with exactly controlled micro- and macrostructure and with functional groups of various type inserted at a precisely selected location in polymer chain are described in Examples 2 to 3. They are compared with non-functionalized copolymer described in Example 1.

Inertization Step:

1200 grams of cyclohexane were added to a nitrogen-purged two liter reactor and treated with 1 gram of a 1.6 M solution of n-butyllithium in cyclohexane. The solution was heated to 70° C. and vigorously stirred for 10 minutes, to clean and inert the reactor. The reactor contents were then removed via a drain valve, and nitrogen was purged again.

Example 1 (Reference Sample)

820 g of cyclohexane were added to the inerted two liter reactor, followed by addition of 31 grams of styrene and 117 grams of 1,3-butadiene. The inhibitors from the styrene and the 1,3-butadiene were removed. 2.21 mmoles of tetramethylethylenediamine (TMEDA) were then added, to provide random incorporation of styrene monomer and to increase the vinyl content of the butadiene units. The solution inside the reactor was heated to 60° C. and was continuously stirred during the whole process. When the desired temperature had been reached, 0.045 mmoles of n-butyllithium were added to perform quenching of residual impurities. Then, 0.845 mmoles of n-butyllithium were added to initiate the polymerization process. The reaction was carried out as an isothermic process for 60 minutes. 0.0525 mmoles of silicontetrachloride were then added to the polymer solution as a coupling agent. Coupling was performed for 5 minutes. The reaction was terminated using 1 mmol of nitrogen-purged isopropyl alcohol and was then rapidly stabilized by addition of 2-methyl-4,6-bis(octylsulfanylmethyl)phenol in an amount of 1.0 phr polymer. The polymer solution was then treated with ethanol, and precipitation of polymer occurred. The final product was dried overnight in a vacuum oven.

Example 2

820 g of cyclohexane were added to the inerted two liter reactor, followed by the addition of 31 grams of styrene and 117 grams of 1,3-butadiene. The inhibitors from the styrene and the 1,3-butadiene were removed. 4.45 mmoles of tetramethylethylenediamine (TMEDA) were then added as a styrene randomizer and to increase the vinyl content of the units derived from butadiene monomer. The solution inside the reactor was heated to 60° C. and was continuously stirred during the whole process. Upon reaching this temperature, 0.067 mmoles of n-buthyllithium were added to the reactor, to quench residual impurities.

To another 100 mL glass vessel, 20 grams of cyclohexane were added, followed by addition of 1.70 mmoles of n-butyllithium and 1.70 mmoles of 1-(4-ethenylbenzyl)pyrrolidine. The mixture was mixed for 10 minutes at room temperature and transferred as initiator into the two liter reactor. The reaction was carried out as an isothermic process for 45 minutes.

After polymerization had ceased, 1.70 mmoles of 1-(4-ethenylbenzyl)pyrrolidine were added to the solution of living polymer. Addition of 1-(4-ethenylbenzyl)pyrrolidine was performed at 60° C. for 15 minutes. Then, 0.338 mmoles of dimethyldichlorosilane were added to the solution of living polymer, and the reaction was continued for 5 minutes. Functionalization was performed by adding the alkoxysilane derivative (0.348 mmoles of glycidoxypropyltrimethoxysilane) to the polymer solution. Functionalization was carried out at 60° C. for 20 minutes. The reaction was terminated using 1 mmol of nitrogen-purged isopropyl alcohol and rapidly stabilized by the addition of 2-methyl-4,6-bis(octylsulfanylmethyl)phenol at 1.0 phr polymer. The polymer solution was treated with ethanol, and precipitation of polymer occurred. The final product was dried overnight in a vacuum oven.

Example 3

To the inerted two liter reactor, 820 g of cyclohexane were added, followed by addition of 31 grams of styrene and 117 grams of 1,3-butadiene. The inhibitors from the styrene and the 1,3-butadiene were removed. 4.45 mmoles of tetramethyleneetylenediamine (TMEDA) were added as a styrene randomizer and to increase the vinyl content of the units derived from butadiene monomer. The solution inside the reactor was heated to 60° C. and continuously stirred during the whole process. Upon reaching the temperature, 0.067 mmoles of n-butyllithium were added to the reactor, to perform quenching of residual impurities.

To another 100 mL glass vessel, 20 grams of cyclohexane were added, followed by addition of 1.70 mmoles of n-butyllithium and 3.36 mmoles of 1-(4-ethenylbenzyl)pyrrolidine. The mixture was mixed at room temperature for 10 minutes and transferred as initiator to the two liter reactor. The reaction was carried out for 45 minutes as an isothermic process. After polymerization had ceased, 3.36 mmoles of 1-(4-ethenylbenzyl)pyrrolidine were added to the solution of living polymer. Addition of 1-(4-ethenylbenzyl)pyrrolidine was performed at 60° C. over 15 minutes. 0.338 mmoles of dimethyldichlorosilane were then added to the solution of living polymer, the reaction was carried out over 5 minutes. Functionalization was performed by the addition of the alkoxysilane derivative (glycidoxypropyltrimethoxysilane, 0.348 mmoles) to the polymer solution. Functionalization was carried out at 60° C. for 20 minutes. The reaction was terminated using 1 mmol of nitrogen-purged isopropyl alcohol, and was rapidly stabilized by the addition of 2-methyl-4,6-bis(octylsulfanylmethyl)phenol at 1.0 phr polymer. The polymer solution was then treated with ethanol, and precipitation of polymer occurred. The final product was dried overnight in a vacuum oven.

Characterization

Vinyl Content (%)
Determined by 600 MHz $^1$H-NMR, based on BS ISO 21561:2005
Bound Styrene Content (%)
Determined by 600 MHz $^1$H-NMR, based on BS ISO 21561:2005
Molecular Weight Determination
Gel permeation chromatography was performed via PSS Polymer Standards Service multiple columns (with guard column) using THF as the eluent and for sample preparation. Multi-angle laser light scattering measurements were carried out using a Wyatt Technologies Dawn Heleos II light scattering detector, DAD (PDA) Agilent 1260 Infinity UV-VIS detector and Agilent 1260 Infinity refractive index detector.
Glass Transition Temperature (° C.)
Determined based on PN-EN ISO 11357-1:2009
Mooney Viscosity (ML 1+4, 100° C.)
Determined based on ASTM D 1646-07, using an L rotor under the conditions of preheating=1 minute, rotor operating time=4 minutes, and temperature=100° C.
Vulcanization Characteristics
Determined based on ASTM D6204, using RPA 2000 Alpha Technologies rubber processing analyzer, operating time=30 minutes, and temperature=170° C.
Evaluation and Measurement of Properties of Rubber Composition
A rubber composition (vulcanized) was prepared using a polymer obtained in each of Examples, and was measured for the following test items
Tyre Predictors (tan δ at 60° C., tan δ at 0° C., tan δ at −10° C.)
A vulcanized rubber composition was used as a test sample and measured for this parameter, using a dynamic mechanical analyzer (DMA 450+ MetraviB) in shear mode under the conditions of tensile strain=2%, frequency=10 Hz, in the range of temperature from −70 to 70° C., with heating rate of 2.5° C./min.
Rebound Resilience
Determined based on ISO 4662
Table 1 shows the characterization results for the three samples synthesized for this study.

TABLE 1

| Example | $M_n$ [g/mol] | $M_w$ [g/mol] | $M_w/M_n$ | Vinyl content [%][1] | Styrene content [%] | Mooney | Tg [°C.] |
|---|---|---|---|---|---|---|---|
| 1 (reference) | 190,000 | 339,000 | 1.79 | 60.73 | 20.41 | 50.5 | −24.1 |
| 2 | 230,000 | 373,000 | 1.62 | 62.96 | 21.86 | 51.6 | −22.1 |
| 3 | 222,000 | 367,000 | 1.65 | 62.67 | 21.67 | 49.3 | −23.3 |

[1]Based on 1,3-butadiene content

Compounding

Using each of the rubbers obtained in Examples 2 and 3 and Reference sample 1, compounding was made according to the "compounding recipe of rubber composition" as shown in Table 2 below. The compounds were mixed in two steps in Banbury type of internal mixers (350E Brabender GmbH & Co. KG): step 1 in the white mixing line, step 2 in the black one. The conditioning time between steps 1 and 2 was 24 hours. In the third step vulcanizing agents were mixed into the compound on a two-roll mill at 50° C. The conditioning time between steps 2 and 3 was 4 hours. Then, each unvulcanized rubber composition was vulcanized at 170° C., for T95+1.5 minutes (based on RPA results) to obtain rubber compositions (vulcanized compositions). Each vulcanized rubber composition was evaluated and measured for the above-mentioned tensile properties, tire predictors and rebound resilience. The results are shown in Table 3.

TABLE 2

| Component | phr |
|---|---|
| SBR | 75 |
| Polybutadiene rubber[1] | 25 |
| Silica[2] | 80 |
| Carbon Black[3] | 10 |
| Stearic acid | 2 |
| Zinc oxide | 3 |
| Oil extender[4] | 37.5 |
| 6PPD[5] | 2 |
| Bis[3-(triethoxysilyl)propyl]tetrasulfide[6] | 6.4 |
| N-tert-butyl-2-benzothiazole sulfenamide[7] | 1.7 |
| 1,3-Diphenylguanidine[8] | 2 |
| Sulphur | 1.5 |

[1]Synteca 44, a product of Synthos
[2]Zeosil 1165MP, a product of Solvay
[3]ISAF-N234, a product of Cabot Corporation
[4]VivaTec 500, a product of Klaus Dahleke KG
[5]VULKANOX 4020/LG, a product of Lanxess
[6]Si 69, a product of Evonik
[7]LUVOMAXX TBBS, a product of Lehmann & Voss & Co. KG
[8]DENAX, a product of Draslovka a.s.

TABLE 3

| Example | Rebound resilience [%] | Tyre predictors | | | Payne effect G'1-G'90 [kPa] |
|---|---|---|---|---|---|
| | | Tan δ (60° C.)[1] | tan δ (0° C.)[2] | tan δ (−10° C.)[3] | |
| 1 | 32.45 | 0.1779 | 0.4968 | 0.6265 | 431.71 |
| 2 | 35.54 | 0.1486 | 0.5844 | 0.6693 | 215.42 |
| 3 | 35.92 | 0.1450 | 0.6203 | 0.7046 | 207.77 |

[1]Rolling resistance (lower is better)
[2]Wet traction (higher is better)
[3]Ice traction (higher is better)

It is deduced from these results that in a silica mix, judged on the basis of the properties in the vulcanized state, SSBR 3 according to the invention imparts to the corresponding rubber composition 3 reinforcement properties which are superior to those obtained with the control SSBR 1 and with the other SBR 2 according to the invention.

Furthermore, it will be noted that the tyre predictors of rubber composition 3 according to the invention are improved relative to those of the control rubber composition 1 and of the other rubber composition 2 according to the invention. Moreover, said tyre predictors are improved for rubber composition 2 according to the invention relative to the control rubber composition 1.

While certain representative embodiments and details have been shown for the purpose of illustrating the subject invention, it will be apparent to those skilled in this art that various changes and modifications can be made therein without departing from the scope of the subject invention, which scope is defined by the following claims.

The invention claimed is:

1. A method of polymerization comprising copolymerizing (i) one or more conjugated diene monomers and (ii) one or more vinyl aromatic monomers with an initiator of an alkali metal salt derivative of a vinyl aromatic monomer having general formula (A)

(A)

wherein
the alkali metal is selected from lithium, sodium, and potassium; and
R is selected from groups of formula (B) and (C):

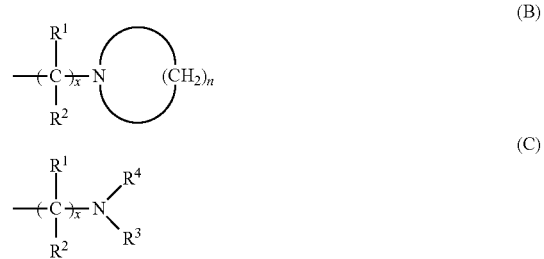

wherein
x is an integer of from 1 to 10;
n is an integer of from 2 to 10;
$R^1$ and $R^2$ groups within a repeat unit and in different repeat units are independently selected from a hydrogen atom and an alkyl group having from 1 to 4 carbon atoms; and
$R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula —$(CH_2)_y$—O—$(CH_2)_z$—$CH_3$, wherein y is an integer of from 1 to 10 and z is an integer of from 1 to 10.

2. The method of claim 1, wherein the alkali metal is lithium.

3. The method of claim 1, wherein R is a group of formula (B), and
x is 1 or 2;
$R^1$ is a hydrogen atom, and
n is 4 or 6.

4. The method of claim 1, wherein R is a group of formula (II), and
x is 1;
$R^1$ is a hydrogen atom, and
n is 4 or 6.

5. The method of claim 1, wherein R is a group of formula (II), and
x is 1 or 2;
$R^1$ and $R^2$ are both a hydrogen atom, and
n is 4 or 6.

6. The method of claim 1, wherein R is a group of formula (II), and
x is 1 or 2;
$R^1$ is a hydrogen atom, and
n is 4.

7. The method of claim 3, wherein the compound of formula (A) is N-vinylbenzylpyrrolidine.

8. The method of claim 3, wherein the compound of formula (A) is N-(3-vinylbenzyl)pyrrolidine or N-(4-vinylbenzyl)pyrrolidine.

9. The method of claim 3, wherein the compound of formula (A) is N-(4-vinylbenzyl)pyrrolidine.

10. The method of any one of claims 1 to 7 wherein the derivative is of formula (D)

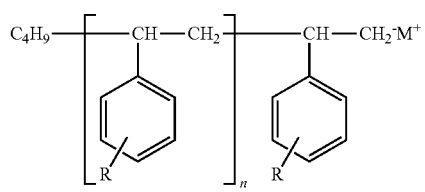

wherein
$M^+$ is the alkali metal, and
n is an integer of from 0 to 20.

11. A process for the preparation of a copolymer component comprising coupled copolymer and terminally modified copolymer, the process comprising:
a) providing an initiator component comprising one or more alkali metal salt derivatives of a vinyl aromatic monomer having general formula (A)

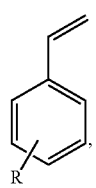

wherein
the alkali metal is selected from lithium, sodium, and potassium; and
R is selected from groups of formula (B) and (C):

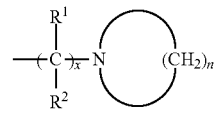

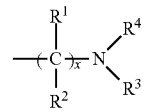

wherein
x is an integer of from 1 to 10;
n is an integer of from 2 to 10;
$R^1$ and $R^2$ groups within a repeat unit and in different repeat units are independently selected from a hydrogen atom and an alkyl group having from 1 to 4 carbon atoms; and
$R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula $-(CH_2)_y-O-(CH_2)_z-CH_3$, wherein y is an integer of from 1 to 10 and z is an integer of from 1 to 10;
b) contacting a monomer component comprising
i) one or more conjugated diene monomers and
ii) one or more vinyl aromatic monomers
with the initiator component, to initiate anionic copolymerization;
c) continuing copolymerization, to result in a copolymer;
d) continuing copolymerization of the copolymer, in the presence of one or more functionalized monomers, to result in a functionalized copolymer;
e) coupling a part of the functionalized copolymer with one or more coupling agents, to result in coupled copolymer; and
f) terminally modifying a part of the functionalized copolymer with one or more terminal modifying agents, to result in terminally modified copolymer.

12. The process of claim 11 wherein step b) is an addition of the initiator component to the monomer component, to initiate anionic copolymerization.

13. A copolymer component, obtained by the process according to claim 11.

14. A copolymer component comprising coupled copolymer I) and terminally modified copolymer II),
I) the coupled copolymer being obtained by a process comprising
Ia. contacting a monomer component comprising i) one or more conjugated diene monomers and ii) one or more vinyl aromatic monomers, in the presence of an initiator component comprising one or more alkali metal salt derivatives of a vinyl aromatic monomer having general formula (A)

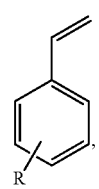

wherein
the alkali metal is selected from lithium, sodium, and potassium; and
R is selected from groups of formula (B) and (C):

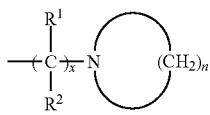
(B)

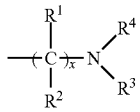
(C)

wherein
x is an integer of from 1 to 10;
n is an integer of from 2 to 10;
$R^1$ and $R^2$ groups within a repeat unit and in different repeat units are independently selected from a hydrogen atom and an alkyl group having from 1 to 4 carbon atoms; and
$R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula $-(CH_2)_y-O-(CH_2)_z-CH_3$, wherein y is an integer of from 1 to 10 and z is an integer of from 1 to 10;
Ib. further copolymerization in the presence of one or more functionalized monomers, to result in a functionalized copolymer; and
Ic. coupling a part of the functionalized copolymer with one or more coupling agents, to result in the coupled copolymer;
II) the terminally modified copolymer being obtained by a process comprising
IIa. contacting a monomer component comprising i) one or more conjugated diene monomers and ii) one or more vinyl aromatic monomers, in the presence of an initiator component comprising one or more alkali metal salt derivatives of a vinyl aromatic monomer having general formula (A)

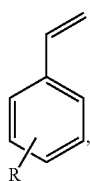
(A)

wherein
the alkali metal is selected from lithium, sodium, and potassium;
R is selected from groups of formula (B) and (C):

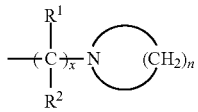
(B)

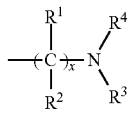
(C)

wherein
x is an integer of from 1 to 10;
n is an integer of from 2 to 10;
$R^1$ and $R^2$ groups within a repeat unit and in different repeat units are independently selected from a hydrogen atom and an alkyl group having from 1 to 4 carbon atoms; and
$R^3$ and $R^4$ are independently selected from alkyl groups containing from 1 to 10 carbon atoms, aryl groups having 6 to 10 carbon atoms, allyl groups having 3 to 10 carbon atoms, and alkyloxy groups having the structural formula $-(CH_2)_y-O-(CH_2)_z-CH_3$, wherein y is an integer of from 1 to 10 and z is an integer of from 1 to 10;
IIb. further copolymerization in the presence of one or more functionalized monomers, to result in a functionalized copolymer; and
IIc. terminally modifying at least part of the functionalized copolymer with one or more terminal modifying agents, to result in the terminally modified copolymer.

15. The copolymer component of claim 14, comprising
1 to 99% by weight of coupled copolymer; and
99 to 1% by weight of terminally modified copolymer.

16. The copolymer component of claim 14, wherein the coupled copolymer has 1 to 11 terminal groups based on the vinyl aromatic monomer having general formula (A).

17. The copolymer component of claim 14, wherein the terminal modified copolymer has 1 to 11 terminal groups based on the vinyl aromatic monomer having general formula (A), at the terminus other than the terminus modified with the terminal modifying agent.

18. The copolymer component of claim 14, wherein the terminal modifying agent comprises alkoxysilyl groups.

19. The copolymer component of claim 14, wherein the coupling agent is of general formula (E):

$$X^1{}_n Y_p X^2{}_m \qquad (E),$$

wherein
Y is selected from silicon (Si), tin (Sn), titanium (Ti), sulfur (S), carbon (C), germanium (Ge), zirconium (Zr), lead (Pb), hafnium (Hf), oxygen (O), and nitrogen (N) atoms and methylene ($CH_2$) groups, or their combination; and p is in a range of from 1 to 20;
$X^1$ is independently selected from
hydrogen (H), chlorine (Cl), bromine (Br) iodine (I), and fluorine (F) or their combination;
alkyl groups containing 1-20 carbon atoms;
hydrocarbyloxy groups where the hydrocarbyl group contains 1-20 atoms;
alkylsilyl groups where the alkyl group contains 1-20 atoms;
alkoxysilyl groups where the alkyl group contains 1-10 carbon atoms;
epoxide or episulfide groups containing 2 to 20 carbon atoms;
or combinations thereof; and
where n is in a range of from 0 to 6; and
$X^2$ is independently selected from
hydrogen (H), chlorine (Cl), bromine (Br) iodine (I), and fluorine (F) or their combination;

alkyl groups containing 1-20 carbon atoms;
hydrocarbyloxy groups where the hydrocarbyl group contains 1-20 atoms;
alkylsilyl groups where the alkyl group contains 1-20 atoms;
alkoxysilyl groups where the alkyl group contains 1-10 carbon atoms;
epoxide or episulfide groups containing 2 to 20 carbon atoms;
or combinations thereof; and
where m is in a range of from 0 to 6.

20. The copolymer component of claim 19 wherein the coupling agent is a silicon halide coupling agent.

21. The copolymer component of claim 19 wherein the coupling agent is a silicon halide coupling agent selected from silicon tetrachloride, silicon tetrabromide, silicon tetrafluoride, silicon tetraiodide, hexachlorodisilane, hexabromodisilane, hexafluorodisilane, hexaiodidisilane, octachlorotrisilane, octabromotrisilane, octafluorotrisilane, octaiodotrisilane, hexachlorodisiloxane, 2,2,4,4,6,6-hexachloro-2,4,6-trisilaheptane, 1,2,3,4,5,6-hexakis[2-(methyldichlorosilyl)ethyl]benzene, and alkyl silicon halides of general formula (G)

(G), wherein $R^5$ is a monovalent aliphatic hydrocarbon group having 1 to 20 carbon atoms or a monovalent aromatic hydrocarbon group having 6 to 18 carbon atoms; n is an integer of 0 to 2; and $X^3$ is selected from chlorine, bromine, fluorine, and iodine atoms.

22. The copolymer component of claim 14, comprising
50 to 90% % by weight of coupled copolymer; and
99 to 1% by weight of terminally modified copolymer.

23. The copolymer component of claim 14, comprising
60 to 80% by weight of coupled copolymer; and
99 to 1% by weight of terminally modified copolymer.

24. The copolymer component of claim 14, comprising
1 to 99% by weight of coupled copolymer; and
10 to 50% by weight of terminally modified copolymer.

25. The copolymer component of claim 14, comprising
1 to 99% by weight of coupled copolymer; and
20 to 40% by weight of terminally modified copolymer.

26. The copolymer component of claim 14, wherein the coupled copolymer has 1 to 5 terminal groups based on the vinyl aromatic monomer having general formula (A).

27. A method for preparing a rubber comprising vulcanizing the copolymer component of claim 14 in the presence of one or more vulcanizing agents.

28. A rubber as obtained according to the method of claim 27.

29. A rubber composition comprising x) a rubber component comprising the rubber of claim 28.

30. The rubber composition of claim 29, further comprising y) a filler component comprising one or more fillers.

31. The rubber composition of claim 29, comprising
x) a rubber component comprising 15% by weight or more of the rubber, and
y) a filler component in an amount of 10 to 150 parts by weight relative to 100 parts by weight of the rubber component.

32. The rubber composition of claim 29, wherein
x) the rubber component further comprises one or more further rubbers.

33. The rubber composition of claim 29, further comprising y) a filler component comprising one or more fillers selected from silica and carbon black.

34. The rubber composition of claim 29, further comprising y) a filler component comprising silica and carbon black.

35. The rubber composition of claim 29, wherein x) the rubber component further comprises one or more further rubbers selected from natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, and halogenated butyl rubber.

36. A rubber composition comprising x) a rubber component comprising the rubber of claim 28, comprising x) 20% by weight or more of the rubber.

37. A rubber composition comprising x) the rubber of claim 28, comprising x) a rubber component comprising 30% by weight or more of the rubber.

38. The rubber composition comprising x) the rubber of claim 28, comprising x) a rubber component comprising 40% by weight or more of the rubber.

39. A tire component comprising the rubber composition of claim 32.

40. A tire comprising the tire component of claim 39.

41. A tire component comprising the rubber composition of claim 32, wherein the tire component is a tire tread.

* * * * *